Dec. 24, 1957 G. A. SEEGERS 2,817,131
PANEL FASTENER
Filed Sept. 4, 1953
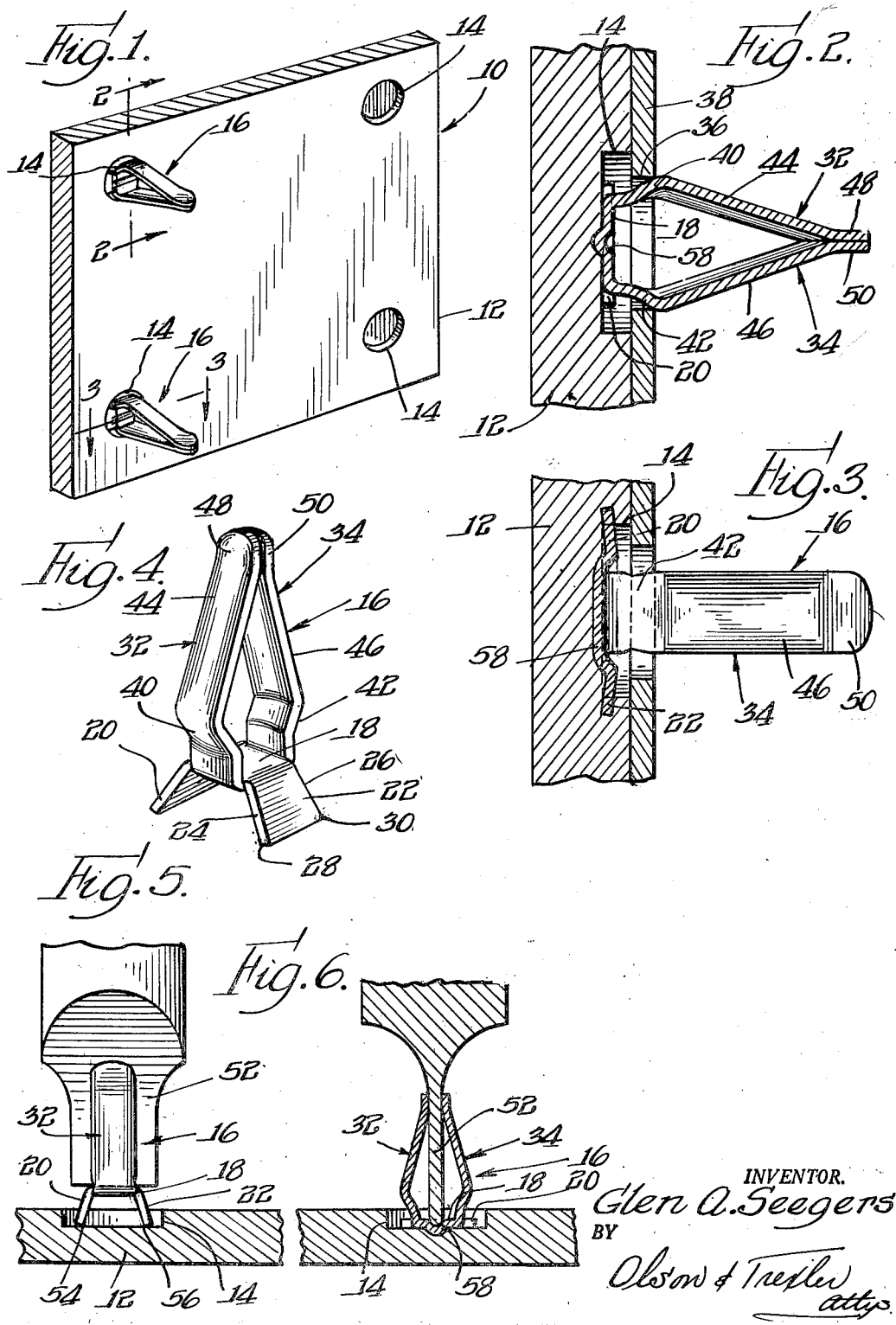
INVENTOR.
Glen A. Seegers
BY
Olson & Tresler
attys.

United States Patent Office 2,817,131
Patented Dec. 24, 1957

2,817,131

PANEL FASTENER

Glen A. Seegers, Lombard, Ill., assignor to Illinois Tool Works, Chicago, Ill., a corporation of Illinois Application September 4, 1953, Serial No. 378,549

1 Claim. (Cl. 24—73)

The present invention relates to a novel detachable panel structure including a novel sheet metal fastener.

In many instances, it is desirable to provide a panel structure which may be easily assembled with, and in certain cases removed from, a supporting frame or other suitable means. For example, such panels may be applied to the exterior of television cabinets and many other types of cabinets, and, in addition, might be used to provide counter tops. When used for such purposes, it is desirable that the exterior surface of the panel remain uninterrupted or unmarred, as of course would not be the case where a screw or the like is passed through the panel to secure it to the supporting structure. It is, therefore, an object of the present invention to provide a novel panel structure which may be easily and quickly detachably secured to supporting means and which has an uninterrupted or unmarred exterior surface.

A further object of this invention is to provide a novel panel structure wherein fastening means may be applied to one side of a panel while leaving the other side of the panel unmarred.

Another object of the present invention is to provide a novel sheet material fastener for a panel structure of the above described type, which fastener if of relatively simple and economical construction and may be easily secured to a panel without marring the exterior surface of the panel.

Still another object of the present invention is to provide a fastener of the above described type and a panel structure including such a fastener, which fastener may be relatively easily snapped into an apertured support means for securing the panel structure to the support means.

Other objects and advantages of the present invention will become apparent from the following description and the drawings, wherein:

Fig. 1 is a perspective view of a panel structure embodying the principles of this invention;

Fig. 2 is an enlarged fragmentary vertical cross sectional view taken along line 2—2 in Fig. 1, and, in addition, shows the panel structure secured to an apertured support member;

Fig. 3 is an enlarged fragmentary horizontal cross sectional view taken along line 3—3 in Fig. 1;

Fig. 4 is a perspective view showing a sheet material fastener embodying the features of this invention; and Figs. 5 and 6 illustrate the manner in which a fastener of the type shown in Fig. 4 may be secured to a panel.

Referring now more specifically to the drawings, wherein like parts are designated by the same numerals throughout the various figures, a panel structure 10 embodying the principles of this invention is shown best in Fig. 1. The panel structure 10 includes a panel or sheet 12 which may be constructed of wood, fibreboard, various synthetic hardboards, and other suitable materials. One or more recesses 14 are formed in the panel 12 and extend only partially therethrough, as shown best in Fig. 2. A fastener member 16 embodying certain novel features of this invention is secured to the panel within each of the recesses 14. For the purpose of illustration, the panel 12 is shown as including recesses 14 adjacent its four corners, and fastener members have been provided in only two of these recesses. It is, of course, understood that normally a fastener member will be provided in each recess, and any desirable number of recesses and fastener members may be provided and arranged to fit the particular requirements of the use to which the panel structure is to be put.

The novel fastener member 16 of this invention is shown best in Figs. 2, 3, and 4 and includes a head section 18 from which a pair of lugs or wings 20 and 22 extend in generally opposite directions. As will appear from the description given hereinbelow, the lugs or wings are adapted to be driven into the panel 12 to fix the fastener member securely to the panel. Thus, the lugs or wings are initially formed so that they extend axially away from one side of the head section and diverge outwardly with respect to each other to facilitate application to the panel. In addition, opposed edges of the wings or lugs, such as the edges 24 and 26 of the wing 22, diverge from each other to provide the wing 22 with the sharp corners 28 and 30 for digging into the panel. These diverging edges are also adapted to interengage with material of the panel to restrain removal of the lug or wing from the panel. It is understood, of course, that the lug or wing 20 is similarly formed with diverging edges to provide sharp corners thereon and to interengage with material of the panel.

The fastener 16 also includes a stud section having legs 32 and 34 extending from margins of the head section and generally axially from the head section in a direction away from the lugs or wings 20 and 22. These stud legs are adapted to be inserted through an aperture 36 in a panel supporting member 38 in the manner shown in Fig. 2 and are provided with diverging abutment portions 40 and 42 adjacent the head section for engaging behind the support member, thereby to secure the panel structure to the support member. As shown best in Figs. 2 and 4, the stud legs are preferably provided with a generally concavo-convex transverse cross section so as to increase the strength thereof. The outer end portions 44 and 46 of the stud legs converge together to facilitate application of the stud section through the aperture 36. Preferably, the free terminal end portions 48 and 50 of the stud legs are at least initially slightly spaced from each other and are parallel to or even slightly flared away from each other to facilitate entry therebetween of a tool used to secure the fastener to the panel 12 in the manner described below. It is understood, of course, that the fastener 16 is constructed from a single piece of sheet metal which is heat treated to give the stud legs sufficient resiliency to permit them to yield toward each other for application to the apertured support member and then spring apart to grip the support member securely. At the same time, the sheet metal is heat treated so that the lugs or wings 20 and 22 may be deformed in the manner described below for securing the fastener to the panel 12.

The fastener 16 may be conveniently secured to the panel 12 in the manner illustrated best in Figs. 5 and 6. The fastener is first inserted into the recess 14 in the panel so that the ends of the lugs or wings 20 and 22 rest on the bottom of the recess. A narrow blade 52 of a suitable tool is then inserted between the stud legs 32 and 34 and moved downwardly until the lower end of the tool rests on the head section 18 in the manner shown in Fig. 5. The tool is then forced downwardly, and this action causes the diverging lugs 20 and 22 to flare outwardly and slide along the bottom of the recess 14. In addition, the diverging and inclined position of the lugs or wings presents the ends thereof at an angle to the panel so that the relatively sharp edges 54 and 56 thereof and the above mentioned sharp corners dig into the bottom of the recess to imbed the lugs partially in the panel. It should be noted that the width of the recess 14 is substantially less than the distance between the ends of the opposed lugs or wings when the lugs are substantially completely flattened so that the lugs not only dig into the bottom of the recess, but also dig through the side walls of the recess and imbed themselves in the panel in the manner shown best in Fig. 3. As the tool is moved downwardly to flatten the lugs 20 and 22, a narrow bead 58 is formed which extends across the head section and at least partially into the lugs. This bead increases the rigidity of the lugs and prevents them from bending so as to permit disassembly of the fastener from the panel.

From the above description, it is seen that the present invention has provided a novel panel structure, wherein the exterior surface of the panel is unmarred and which panel structure may be relatively easily and quickly assembled with an apertured support member. More specifically, it is seen that the present invention has provided a novel panel structure including a panel of suitable material and one or more sheet metal snap fasteners which are securely fastened to the panel in a manner so as to prevent marring of the exterior surface of the panel. In addition, it is seen that the present invention has provided a novel fastener which may be relatively easily and securely fixed to the panel and which may be easily applied to an apertured support member.

While the preferred embodiments of the present invention have been shown and described herein, it is obvious that many structural details may be changed without departing from the spirit and scope of the appended claim.

I claim:

A one-piece sheet metal fastener formed from a cruciformed blank for securing a panel having a recess in the back surface therefor to an apertured support member, and comprising a head section insertable into said recess, a stud section including a pair of legs extending generally axially in one direction from opposite margins of said head section and adapted for insertion into an aperture in a support member, and a pair of lug means extending from other opposite margins of said head section and disposed in quadrature with respect to said legs and diverging laterally outwardly from each other and in a direction away from the direction in which said legs extend, the terminal ends of said lug means being initially spaced from each other a distance less than the width of the panel recess to permit positioning of the lug means within the recess, each of said lug means including a relatively broad free edge with side edges diverging outwardly thereto from said head section, said lug means being deformable to spread the terminal ends laterally outwardly for penetration into the opposite walls of the recess and with the diverging side edges thereof adapted to interengage with the material of the panel to restrain removal of the lug means therefrom, said head section presenting a tool engageable surface between the legs at their junction with the head section, the outer portions of said legs positioned adjacent one another to provide a guide therebetween for passage of a flat blade tool into contact with the tool engageable surface of the head section substantially across the center line traversing said pair of lug means whereby pressure on the tool to spread the lug means into engagement with the panel forms a rigidifying rib extending across the said center line of the head section and into the oppositely disposed lug means for resisting bending of the lug means and disassembly thereof from the panel.

References Cited in the file of this patent

UNITED STATES PATENTS

| | | |
|---|---|---|
| 1,399,183 | Bicker | Dec. 6, 1921 |
| 1,976,889 | Place | Oct. 16, 1934 |
| 2,152,603 | Pender | Mar. 28, 1939 |
| 2,154,711 | Van Uum | Apr. 18, 1939 |
| 2,199,347 | Roethal | Apr. 30, 1940 |
| 2,327,329 | Murphy | Aug. 17, 1943 |
| 2,379,349 | Grinde | June 26, 1945 |
| 2,598,776 | Flora | June 3, 1952 |